April 2, 1968  A. L. NASVYTIS ET AL  3,375,727
TRANSVERSELY ORIENTED REDUCTION DRIVE
Filed Feb. 17, 1966  3 Sheets-Sheet 1

INVENTORS
Algirdas L. Nasvytis
Philip Rountree
BY Hill, Sherman, Meroni, Gross & Simpson

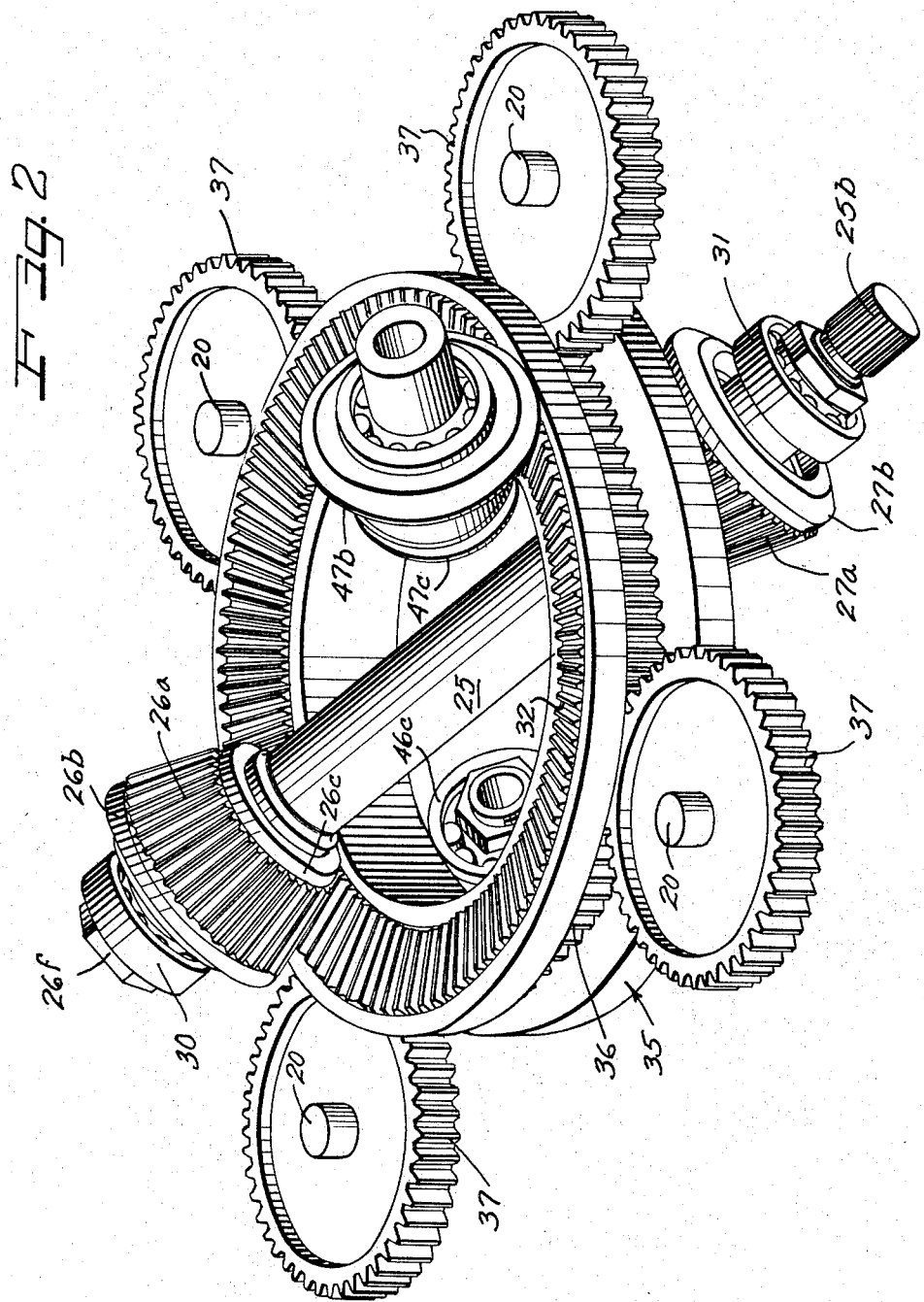

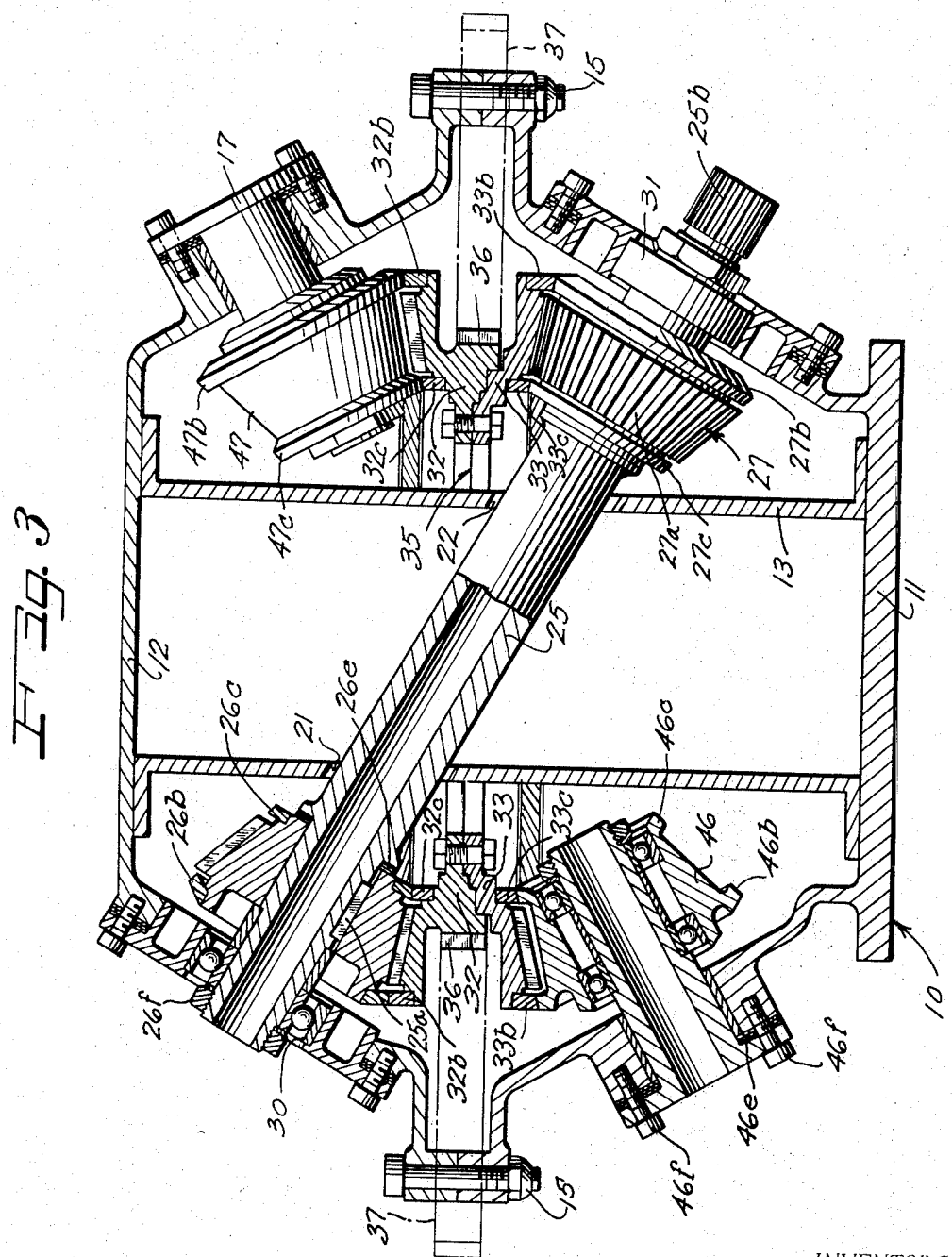

United States Patent Office 3,375,727
Patented Apr. 2, 1968

3,375,727
TRANSVERSELY ORIENTED REDUCTION DRIVE
Algirdas L. Nasvytis, Cleveland, and Philip L. Rountree, Gates Mills, Ohio, assignors to TRW Inc., Cleveland, Ohio, a corporation of Ohio
Filed Feb. 17, 1966, Ser. No. 528,165
10 Claims. (Cl. 74—417)

ABSTRACT OF THE DISCLOSURE

A drive system providing for an abrupt change in drive line direction and orientation through the provision of an annular bevel gear having bevel teeth on both sides thereof for cooperation with balanced bevel pinions. Through orientation of the planets superior torque transference at high velocity and under adjustable preloads are provided in a balanced manner.

---

As those skilled in the gearing art are aware, many drive systems have been designed employing bevel gears to provide the transfer of power between shafts positioned generally transversely of each other. In recent times one very important utilization of such gearing has been in helicopters. However, the demands of helicopter drives have far surpassed the capabilities of conventional bevel gear systems. For example, in helicopter drives presently being employed in military and commercial applications, it has been found impractical to apply loads of greater than 5,000 horsepower at 22,000 to 24,000 feet per minute pitch line velocities. Systems operating at such loads and velocities are marginal, the life of the system being measured in a very few hours. Even with a substantial reduction in horsepower loading, it has been found in practice that a standard bevel gear system is the shortest life link in the helicopter transmission train.

It is, of course, essential that in aircraft systems such as helicopters, vertical take-off airplanes, as well as in hydrafoil naval ships, that maximum life with complete safety be provided. The achievement of such a goal requires a substantial improvement in gearing concepts. Gearing constructed in accordance with the present invention has very substantially increased the useful life of such transverse force-transmitting gearing and has rendered possible the transmission of substantially larger forces than heretofore possible.

In accordance with the principles of the present invention, bevel gearing is provided in which a pair of axially aligned bevel gears are provided for the transverse transfer of drive torque from a single drive shaft to oppositely directed bevel gear surfaces positioned on opposite sides of the axis of the output shaft. Similarly, the system of the present invention provides for loading the drive shaft at spaced points 180° apart. As a result of the construction of the present invention, the drive load is shared by a pair of substantially equally loaded drive pinions. These pinions are mounted for rotation on a single drive shaft which projects transversely of a driven shaft, and obliquely positioned with respect thereto. By the provision of an annular bevel gear supported externally, rather than by way of a central shaft, the drive shaft is permitted to pass completely through the bevel gear for bevel contact with that gear on opposite sides thereof. Further idler pinions are provided and a rigid housing supports the drive pinions and idler pinions in a manner and with a strength heretofore unknown in transversely oriented drive systems. As a result of the support of the driven bevel by way of the drive pinions, and as a result of the support of the drive pinions and driven bevel in a rigid housing, the system is particularly adaptable to gear trains employing a ring output with a stationary set of intermediate pinions.

It is, accordingly, an object of the present invention to provide a novel and substantially improved gear drive system.

Another object of the invention is to provide a substantially balanced drive system for the transference of power between transversely oriented drive and driven shafts.

Another object of the present invention is to provide a simplified drive for helicopters and the like.

A feature of the invention resides in the utilization of an annular internal bevel driven gear cooperable with a pair of drive pinions contacting opposite sides thereof.

Another feature of the invention resides in the provision of an annular sun member for a drive system wherein the sun is directly driven on opposite sides of its axis of rotation and on oppositely facing axial surfaces.

Still another object of the present invention is to provide a novel and improved bevel gear support.

Still other and further objects and features of the present invention will at once become apparent to those skilled in the art from a consideration of the attached specification and drawings wherein a preferred embodiment of the invention is shown by way of illustration only, and wherein:

FIGURE 2 is an isometric illustration of a portion of the gearing; and

FIGURE 3 is a partial section, somewhat enlarged, of the structure illustrated in FIGURE 1 partially cut away to further illustrate the internal construction thereof.

As shown on the drawings:

Figure 1:
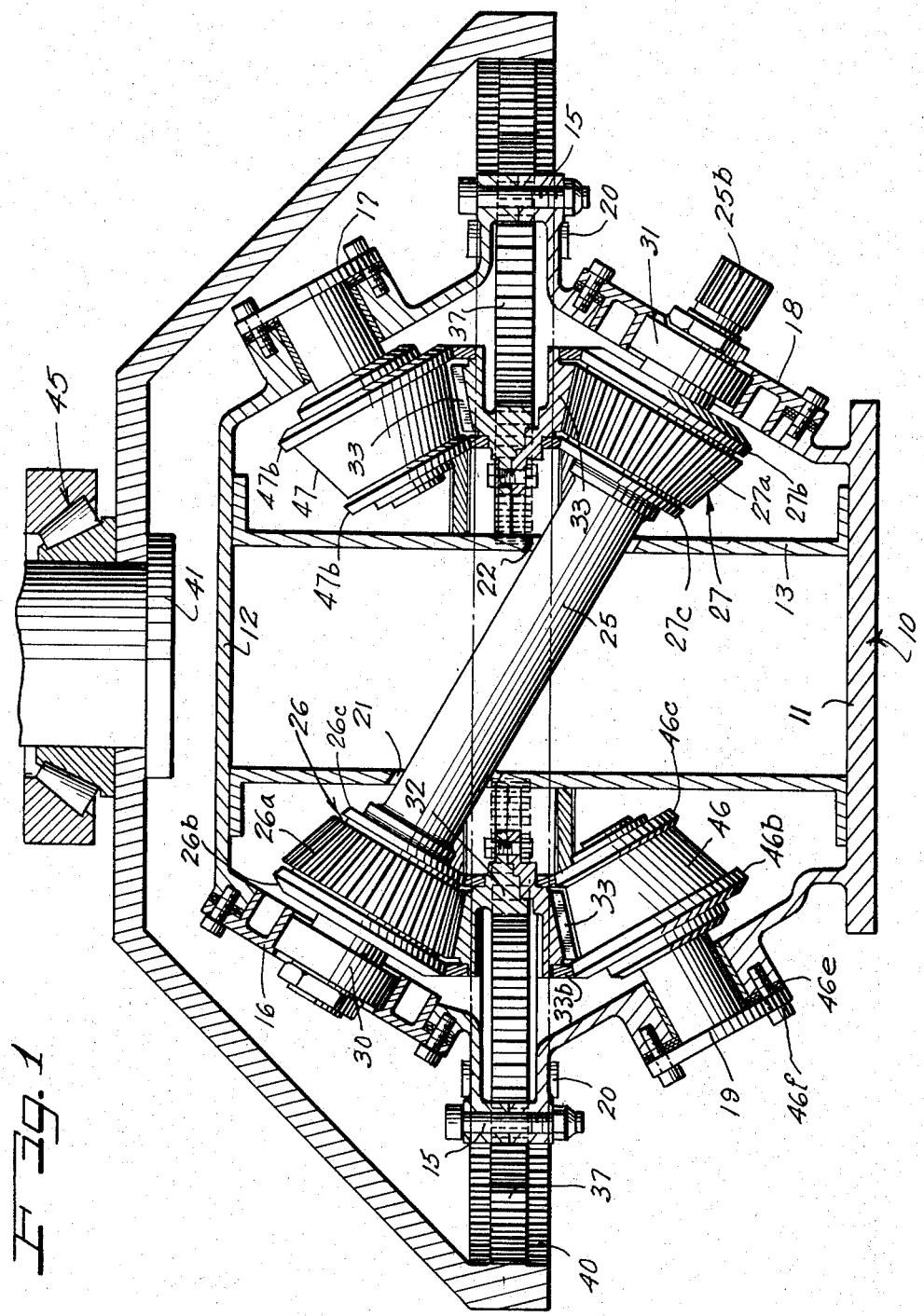
FIGURE 1 is a side-elevational view in partial cross-section of a drive system constructed in accordance with the present invention.

As may be seen from a consideration of the figures, the drive system of the present invention comprises a rigid housing generally indicated at 10 comprising bottom plate 11 and top plate 12 welded or otherwise affixed to a generally cylindrical tube 13. The plates 11 and 12 are preferably identical and are dished for rigid interconnection by means of bolts 15. Each of the cup-shaped plates 11 and 12 is provided with a pair of obliquely facing bearing supports generally indicated at 16, 17, 18 and 19. Additionally, the housing, formed by plates 11, 12 and 13, carries a plurality of pivot elements 20 for the rotational support of intermediate gear members described below.

As may be seen from a consideration of FIGURE 1, the tubular support portion 13 is provided with a pair of aligned apertures 21 and 22 adapted for the passage of a drive shaft 25. The drive shaft is provided with bevel gear pinions 26 and 27 composed of gear teeth 26a and 27a with mating roller surfaces 26b, 26c, 27b and 27c constructed on the pitch circles of the respective gear teeth. Ball bearings are provided at 30, 31 for supporting the shaft 25 rigidly relative to the housing 10. The bevel pinions 26a and 27a cooperate with conical surfaces 32 and 33 forming the axially oppositely facing surfaces of an annular sun member 35. In addition to the conical gear surfaces 32 and 33, the annular sun is provided with peripherally radially outwardly facing gear teeth 36 arranged for driving cooperation with intermediate gears 37 which are rotatively carried by bearings 20 fixedly supported in the housing 10, and which are drivingly associated with the annular ring member 40. Ring member 40 is in turn rigidly secured to an output shaft 41 which is, in the case of a helicopter drive, for example, supported for thrust loads by means of a tapered roller bearing generally indicated at 45 and which may be rigidly supported within an external housing, not shown.

Details of the drive shaft interrelationship with the annular sun member may be clearly seen from FIGURES 2 and 3. Drive pinions 26 and 27 are respectively splined to the shaft 25, as for example by key 25a. Accordingly, the application of torque to the spline 25b of shaft 25 will cause rotation of bevels 26, 27. The bevel pinions 26 and 27 not only transmit torque to, but also provide bearing support for, the sun gear portions 32 and 33 by way of the annular bearing rings 26b, 26c and 27b, 27c. The rings 26b, 26c and 27b and 27c are, as may be clearly seen from a consideration of FIGURE 3, pressed in a force-fit relationship onto the respective bevel gears 26, 27 and may, if found necessary, be welded or brazed thereto. The contact surfaces of the rings 26b, 26c, 27b, 27c are coincident with the pitch circles of the bevel gear teeth 26 and 27 respectively and cooperate with, respectively, annular bearing rings 32b, 32c and 33b, 33c similarly having contact surfaces on the pitch line of the respective level or conical tooth surfaces 32, 33.

The sun member 35 is supported in space in gear drive coaction with the pinion gears 26 and 27 by means of backing pinions 46 and 47. Although these pinions may, of course, be provided with bevel teeth for cooperation with the teeth 33, 32, respectively, the function of the back-up pinions 46, 47 is to provide for alignment and load balance. Accordingly, pinions 46 and 47 are preferably merely provided with friction edge surfaces 46b, 46c and 47b, 47c for respective cooperation with the annular rings 33b, 33c and 32b, 32c, respectively, at the pitch lines of the respective gears 33 and 32.

As a result of the arrangement shown, the sun gear 35 is positively supported in space by respective pairs of directly opposed bearing-gear support members. Due to the fact that the gears 26 and 27, as well as the supports 46 and 47 are conical pinions, axial motions of the opposed pinions will provide for a slack adjustment. Thus, if the support pinions 46 and 47 are axially moved toward each other, a tighter support will be provided against the ring 35. Similarly, movement of the pinions 26 and 27 toward each other will provide a tightening effect. Adjustment of these bevel pinion elements is readily accomplished by means, for example, of adjusting shims 26e and 46e combined with adjusting nuts 26f and 46f, respectively.

It will be seen from a consideration of the structure above described, that we have provided a uniquely strong, balanced, drive system. With an input shaft 25 rotating at velocities in excess of 20,000 r.p.m. for example, it is imperative to provide essentially distortionless bearing support. In conventional single pinion systems, the application of loads to the pinion provides a cocking distortion providing discontinuous load transfer characteristics. In this system, the loads are provided with outboard bearing supports such that no cantilever support is provided and essentially undistorted gear tooth surfaces are provided for driving contact with the sun 35. At the same time, the provision of two drive pinions 26, 27, rather than a single drive pinion, permits a reduction of one-half in the tooth load or, alternatively, the transfer of twice the load with the same bearing configuration. By providing the desired preload to the system, through the adjustment of the axial positions of the pinions 26, 27, 46 and 47, the ideal condition of rolling contact for gear location and positive tooth torque transmission contact is provided. At the same time, the axial thrust forces on the sun member 35 are balanced by the application of drive torques to opposite axial faces thereof. Accordingly, the force couples, namely the gear separation couple and the load reaction couple, are substantially balanced by the simple oppositely-acting drive pinions 26, 27 and support pinions 46, 47. The utilization of substantially ideal running conditions permits the construction of a housing of relatively lightweight materials without subjecting it to distortions ordinarily considered unavoidable in prior art support systems used in bevel drive trains. This is particularly important in applications such as helicopter drives where extremely large torques must be transmitted by way of a lightweight system operable over a relatively long period of time.

It will, of course, be apparent to those skilled in the art that the present system does not provide a full 90° change of drive shaft power direction. In installations, such as helicopters for example, in which the output shaft 41 is desired to be essentially vertical, the drive shaft 25 will, in the system illustrated, lie at an angle of approximately 20° to 30° from the horizontal. Prime movers such as turbines may readily be operated at such an angle and, accordingly, the drive is completely satisfactory for such service.

It will further be apparent that variations may be made in the specific construction of the system without in any way departing from the novel concepts of our invention. For example, the sun 35 and intermediate gears 37 may be provided with combination roller surfaces on the pitch lines of the respective gear teeth to improve torque transfer and to assure gear alignment. Similarly, additional peripherally spaced roller pinions 46, 47 may be employed, if desired. It is, accordingly, our intention that the invention be limited solely by the scope of the hereinafter appended claims.

We claim as our invention:

1. A balanced drive system for providing an output rotational about a first axis, comprising an annular member mounted for rotation about said axis and drivingly connected to an output shaft, means driving said annular member comprising two generally conical drive surfaces on axially oppositely facing sides of said annular member, the apex of the conical surface on one side extending toward the other side and the apex of the conical surface on the other side extending toward the one side, a drive shaft rotatable about a second axis transverse to said first axis and extending through said annular member transversely of the axis of rotation thereof and having bevel drive means simultaneously in drive contact with both said drive surfaces, and support means holding said annular member against said bevel drive means, said bevel drive means being axially adjustable toward each other to provide adjustable preload between said bevel drive means and said annular member.

2. The drive system recited in claim 1 wherein said conical drive surfaces and said bevel drive means include toothed gear contacts.

3. The balanced drive system recited in claim 1 wherein said conical drive surfaces and said bevel drive means include both positive toothed gear surfaces and friction surfaces coinciding with the pitch circles of the respective contacting toothed gear surfaces.

4. A balanced drive system for providing an output rotational about a first axis, comprising an annular sun member mounted for rotation about said axis, a ring member rotatable about said axis, a plurality of intermediate members drivingly positioned between said sun and ring members and rotatable about axes parallel to said axis, means driving said sun member comprising two generally conical drive surfaces on axially oppositely facing sides of said sun member, the apex of the conical surface on one side extending toward the other side and the apex of the conical surface on the other side extending toward the one side, a drive shaft rotatable about a second axis transverse to said first axis and extending through said sun transversely of the axis of rotation thereof and having bevel drive means simultaneously in drive contact with both said drive surfaces, and support means holding said sun member against said drive means.

5. The balanced drive system set forth in claim 4 wherein said first axis is substantially vertical.

6. A balanced drive system constructed in accordance with claim 5 wherein a rigid housing is provided supporting said drive shaft and said intermediate members for fixed relative interrelationship.

7. A balanced drive system constructed in accordance with claim 6 wherein said rigid housing includes an external housing support for said drive means and includes additionally an annular rigidifying member extending generally longitudinally of said first axis and through said member into secured position relative to external housing support portion, and wherein said drive shaft passes obliquely through said rigidifying member.

8. A balanced drive system constructed in accordance with the provisions of claim 4 wherein said bevel drive means are axially adjustable toward each other to provide adjustable preload between said bevel drive means and said annular member.

9. A balanced drive system constructed in accordance with the provisions of claim 1 wherein said support means comprises a plurality of bevel members each in rotational supporting contact with said annular member at a point directly opposite from a respective bevel drive means.

10. The balanced drive system of claim 9 wherein said last-named support bevel members are axially adjustable toward each other to increase the preload on said annular member.

References Cited

UNITED STATES PATENTS

| 495,009 | 4/1893 | Bitner | 74—410 |
| 1,449,353 | 3/1923 | Seniw. | |
| 2,486,671 | 11/1949 | Normann | 74—417 |

FOREIGN PATENTS

| 590,140 | 7/1947 | Great Britain. |

ROBERT M. WALKER, *Primary Examiner.*

DONLEY J. STOCKING, *Examiner.*

L. H. GERIN, *Assistant Examiner.*